United States Patent [19]

Lopez

[11] Patent Number: 4,968,982
[45] Date of Patent: Nov. 6, 1990

[54] AIRCRAFT LANDING SYSTEM HAVING SIMPLIFIED OUT-OF-COVERAGE INDICATION (OCI)

[75] Inventor: Alfred R. Lopez, Commack, N.Y.

[73] Assignee: Hazeltine Corporation, Greenlawn, N.Y.

[21] Appl. No.: 377,874

[22] Filed: Jul. 10, 1989

[51] Int. Cl.⁵ .......................... G01S 1/16; G01S 1/18
[52] U.S. Cl. .................................................. 342/408
[58] Field of Search ...................................... 342/408

[56] References Cited

U.S. PATENT DOCUMENTS

| | | | |
|---|---|---|---|
| 4,635,064 | 1/1987 | Chisholm | 342/408 |
| 4,677,442 | 6/1987 | Enein | 342/410 |
| 4,837,580 | 6/1989 | Frazita | 342/374 |

Primary Examiner—Theodore M. Blum
Attorney, Agent, or Firm—E. A. Onders

[57] ABSTRACT

In the ground-based equipment of a microwave landing system (MLS), a linear array antenna is employed to generate both a scanning guidance beam, which provides azimuthal position data to an incoming aircraft, and a pair of out-of-coverage indication (OCI) beams, which are disposed outside of the sector covered by the scanning guidance beam. For sweeping the guide beam, phase shifts are updated in a linear phase gradient to scan the beam to the right and to the left of the centerline of the antenna. To form the pair of OCI beams, the main lobe of the antenna radiation pattern is directed to one side of the antenna's centerline, outside the normal scanning range, thereby producing a grating lobe on the opposite side of the centerline. Furthermore, a quadratic phase shift function is superimposed upon the linear phase gradient to defocus the OCI beams so as to fill a sufficient sector of space, on both sides of the scanned region, for OCI coverage.

5 Claims, 5 Drawing Sheets

AIRCRAFT LANDING SYSTEM HAVING SIMPLIFIED OUT-OF-COVERAGE INDICATION (OCI)

FIELD OF THE INVENTION

This invention relates to microwave landing systems (MLS), which are installed at airports for guiding aircraft to such a system wherein out-of-coverage indication (OCI) is produced in a simplified manner.

BACKGROUND OF THE INVENTION

A current microwave landing system (MLS) includes a phased array antenna for developing an electromagnetic beam which sweeps to and fro symmetrically about an airport runway centerline for guiding an aircraft in azimuth (AZ). In addition, a sector radiation pattern provides a data signal which identifies the transmission and synchronizes an aircraft's MLS receiver to the sweeping pattern of the swept beam. Furthermore, separate out-of-coverage indication (OCI) antennas radiate sector beams angled symmetrically about the runway in regions of space beyond the range of the swept beam. The OCI beams provide reference signals in one or more preassigned time slots to an airborn MLS receiver. The OCI beams are of greater amplitude in out-of-coverage sectors than unwanted direct sidelobe radiation or reflections of the swept beam from irregularities of terrain, such as nearby buildings. The OCI reference signals are employed by the MLS receiver to determine when the aircraft is within an out-of-coverage region to allow the MLS receiver to disregard such unwanted reflections of the swept guidance beam or sidelobe radiation.

These antennas are usually arranged in a cluster beyond the far end of a runway, so as to transmit the swept beam down the runway towards an incoming aircraft. Included within the landing system is timing circuitry which synchronizes the radiation of signals from the various antennas. A sequence of time slots is allowed for the generation of OCI signals from the OCI antennas. The OCI time slots are followed by one cycle of a sweeping of the swept beam which is employed by the MLS receiver to attain azimuth angle of the aircraft relative to the runway centerline. The foregoing sequence of transmissions is continually repeated so that the MLS receiver can continually update the aircraft's position.

The foregoing description applies to the azimuthal guidance of an MLS, it being understood that further signals and antennas are employed for the elevation guidance function. However, the invention pertains only to the azimuthal guidance function. Accordingly, the additional signals and antennas employed for elevation guidance function are omitted in this description of the MLS to facilitate the description of the invention.

In such prior art MLS, since separate antennas are used for AZ guidance and OCI it increases the cost and complexity of the MLS.

It is, therefore, an object of the present invention to provide a new and improved MLS ground system which is simpler, has lower cost and is more versatile than prior MLS ground systems, and has increased OCI capability.

SUMMARY OF THE INVENTION

In accordance with the invention there is provided in an aircraft landing system having ground-based equipment and airborne equipment, ground-based equipment including an array antenna and a sector antenna. The equipment also includes a first means for supplying a data signal to the sector antenna, which data signal includes information useful for guidance function indentification. The ground-based equipment also includes a second means for supplying a set of signals to the array antenna for producing an OCI radiation pattern having a pair of lobes directed on opposite sides of the center-line of the array, and a third means for supplying a set of signals to the array antenna for producing a beam which sweeps to and fro about the centerline of the array. Finally, the ground-based equipment includes switching means for coupling either the first or the second means to the sector and the array antennas at selected times.

For a better understanding of the present invention, together with other and further objects, reference is made to the following description, taken in conjunction with the accompanying drawings, and its scope will be pointed out in the appended claims.

BRIEF DESCRIPTION OF THE DRAWING

FIGS. 4–7 are signal diagrams shown in time registration with each other, and disclose a sequence of signals received, as a function of time, at the incoming aircraft; wherein FIGS. 4, 5, 6 and 7 show signals received at aircraft positions of +30°, +70°, −30°, and −70°, respectively, for the case wherein the OCI signal is transmitted in the first time slot of the six available OCI time slots;

DESCRIPTION OF THE INVENTION

Figure 1:
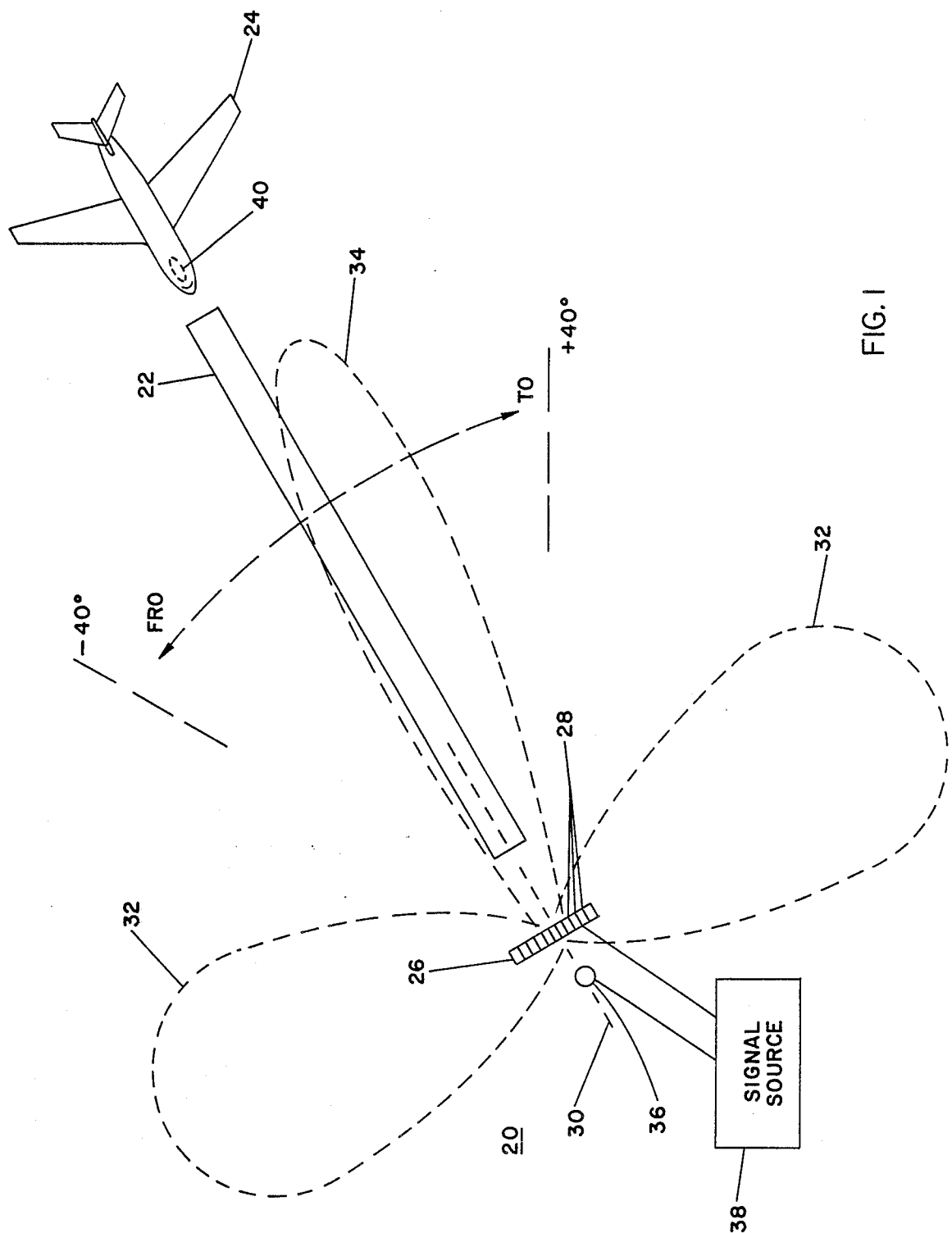
FIG. 1 is a stylized diagrammatic view of an aircraft landing on a runway with guidance from a swept beam and a pair of OCI beams.

FIG. 1 shows an aircraft landing system 20 located at a runway 22 for guiding an incoming aircraft 24 to a safe landing on the runway. Preferably, system 20 is a microwave landing system (MLS). System 20 includes a phased array antenna 26 comprising a linear array of antenna elements 28 located beyond the end of the runway 22 and oriented perpendicular to the longitudinal dimension of the runway. Antenna 26 is centered on the longitudinal axis 30 of runway 22 for generating symmetrically two broad OCI beams 32 simultaneously and, at a later time, a single narrow guide beam 34 which is swept to and fro symmetrically about the axis 30. Antenna 26 is symmetric about an antenna centerline or axis which coincides with the runway axis 30. A data antenna 36 transmits a data signal and has a broad sector antenna pattern. Signals transmitted by the antennas 26 and 36 are generated by a ground-based signal source 38, and are received by an airborne receiver 40 carried by aircraft 24.

Figure 2:
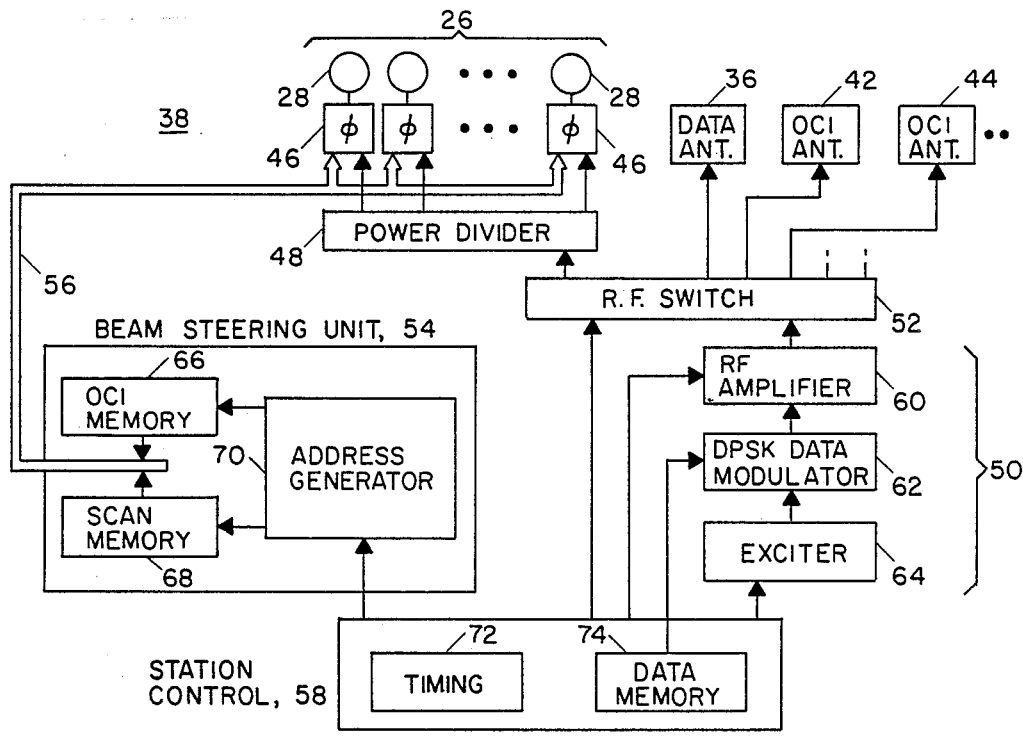
FIG. 2 is a block diagram of the ground-based MLS equipment employed in the system of FIG. 1 for generating signals to be received by an incoming aircraft.

FIG. 2 shows a component of the signal source 38, and the interconnection of signal source 38 with the array antenna 26, the data antenna 36 and additional OCI antennas (not shown in FIG. 1) which may be present in the system 20 to provide additional OCI signals in designated time slots to compensate for anomalies in local geographic features. Two such additional OCI antennas 42 and 44 are shown in FIG. 2. Elements 28 of the array antenna 26 are connected via phase shifter elements, or phasors, 46 to a power divider 48. Electromagnetic power, to be radiated from the elements 28 of the antenna 26, is provided by a transmitter 50. The transmitter 50 is coupled via an Rf (radio frequency) switch 52 to the power divider 48, and then via respective ones of the phasors 46 to individual ones of the elements 28. Divider 48 divides the power of the transmitter 50 among the antenna elements 28. The division of power among the antenna elements 28 is selected so as to produce an amplitude taper to the radiating aperture of the antenna 26 wherein signals of the radiating elements 28 located in the center of the antenna 26 receive a larger amplitude than do signals radiating from elements 28 located away from the center of the antenna 26.

The switch 52 also connects the trasmitter 50 to the data antenna 36 and to the additional OCI antennas 42 and 44. The switch 52 allows power from the transmitter 50 to be coupled alternately among the antenna 26, 36, 42 and 44. Also included within the signal source 38 is a beam steering unit 54 which outputs phase shift command signals via a bus 56 to the phasors 46. The phasors 46 are responsive to the phase shift command signals to apply specific values of phase shift to electromagnetic signals radiated by the antenna elements 28 for forming, in accordance with the invention, either the pair of OCI beams 32 or the scanning guidance beam 34 from the same array antenna 26. Operation of the transmitter 50 and of the beam steering unit 54 is directed by a station control 58.

The transmitter 50 comprises an RF amplifier 60, a data modulator 62, and an exciter 64. The exciter 64 provides an RF carrier signal which is coupled via the modulator 62 to the amplifier 60. The RF carrier signal is amplified by the amplifier 60 to a suitable level. The power level is sufficiently low, approximately 20 watts, to permit the use of PIN diodes in the construction of the switch 52. Thereby, the switch 52 can operate electronically under command of the station control 58. During transmission of an RF signal from the data antenna 36, the modulator 62 is activated by the station control 58 to modulate the RF signal. The modulator 62 is deactiveated by the station control 58 during transmission of RF signals from the array antenna 26 and the OCI antennas 42 and 44.

The beam steering unit 54 comprises two memories 66 and 68 which are addressed by an address generator 70. The OCI memory 66 stores phase shift command signals to be applied to the phasors 46 for generation of the pair of OCI beam 32. The scan memory 68 stores phase shift command signals to be applied to be phasors 46 for generation of successive positions of the guidance beam 34 during a scanning of the guidance beam.

The station control 58 comprises a timing unit 72 and a data memory 74. The timing unit 72 provides timing signals for operating the address generator 70, the switch 52, the amplifier 60, the modulator 62 and the exciter 64. The memory 74 stores data signals to be applied to the modulator 62 for modulation of the RF carrier with the data. The station control 58 may be constructed as a computer which is preprogrammed to direct formation of the various beams and signal formats at the appropriate times for guiding an aircraft to a landing.

In the operation of signal source 38, the station control 58 transmits start, stop and timing signals to the beam steering unit 54.

In the beam steering unit 54, the memory 66 stores the phase-shift command signals in conjunction with identification number of the respective phasors 46. In response to clock signals provided by the timing unit 72, the generator 70 addresses the memory 66 to apply, via the bus 56, phases-shift command signals to respective ones of the phasors 46. This establishes the requisite phase shifts to signals radiated by the respective antenna elements 28. The station control 58 also strobes the exciter 64 to produce pulses of the RF carrier to be applied via the phasors 46 to the antenna elements 28 for radiation from the antenna elements 28. Pulses of RF carrier are produced for generation of the OCI beams 32 and the scanned guidance beam 34. During the transmission of a pulse of radiation for the generation of the scanned guidance beam, the generator 70 continues to address the memory 66 for updating the values of phase shift so as to scan the guidance beam 34 across the runway 22.

Each of the phasors 46 includes a decoder (not shown) to enable the phasors 46 to respond to their respective command signals on the bus 56. If desired, each of the phasors 46 may comprise a counter with up/down and preset controls as is disclosed in U.S. Pat. No. 4,670,756 issued in the name of A. R. Lopez on Jun. 2, 1987. The invention is not restricted to any specific form of phasor 46.

In the operation of landing system 20, the phased array antenna 26 develops the guidance beam 34 and sweeps the beam 34 to and fro about the airport runway 22 for guiding the aircraft 24 in azimuth. A sequence of signal transmission from the various antennas is initiated with a data preamble transmitted by the data antenna 36. The data preamble includes a timing signal which synchronizes the aircraft MLS receiver 40 to the times of occurrence of the beams from the various antennas including the sweeping pattern of the swept beam 34. Furthermore, the array antenna 26 develops the two OCI sector beams 32 transversely to the runway 22 in regions of space outside the sweeping range of the guidance beam 34. The OCI beams provide reference signals to the airborne MLS receiver 40 to allow the MLS receiver 40 to determine that the aircraft 24 is within an out-of-coverage region. Typically, the foregoing antennas are arranged in a cluster centered on a runway axis and located beyond the far end of the runway, so as to transmit the swept beam down the runway towards an incoming aircraft. The preferred embodiment of the invention allows a sequence of up to six times slots for the generation of the OCI signals. The six time slots are followed by one cycle of the swept guidance beam which provides azimuth angle of the aircraft relative to the runway. The foregoing sequence of transmission is provided in a repeating sequence so that the MLS receiver 40 can continually update the aircraft position.

Figure 3:
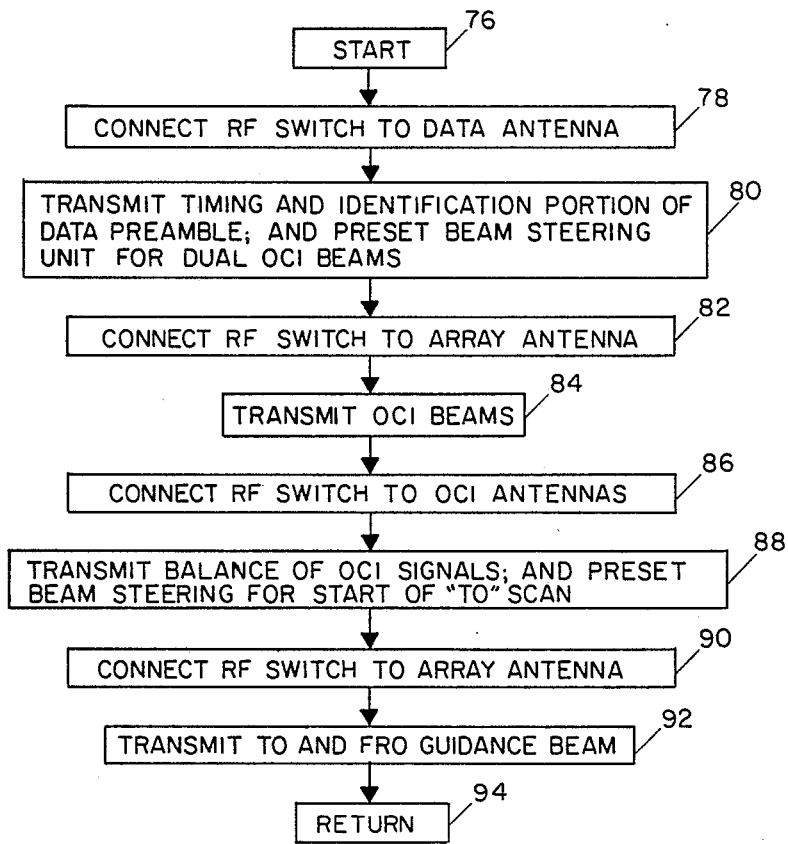
FIG. 3 is a flow chart useful in explaining operation of the system of FIG. 2.

With reference also to FIG. 3, the sequence of operational steps of system 20 will be explained further with the aid of a flow chart. The sequence of operational steps begin at block 76 and proceeds to block 78 wherein the RF switch 52 is operated to connect the data antenna 36 to the transmitter 50. This is followed at block 80 with the transmission of the data preamble from the data antenna 36, the data preamble containing timing and identification for activating the airborne receiver 40. Also the beam steering unit 54 is preset for generation of the two OCI beams 32 from the array antenna 26. Thereafter, at block 84, switch 52 is operated to couple the transmitter 50 to the array antenna 26. This is followed, at block 84 with the transmission of the OCI signals in the two OCI beams 32 (FIG. 1) from the array antenna 26. As noted above, the transmission of the OCI beams is accomplished by setting the phasors 46 with phase shifts provided by the OCI memory 66, and by activating the exciter 64 and the amplifier 60 to produce a pulse of RF carrier to be radiated by antenna 26.

The operation continues at block 86 with the operation of the RF switch 52 to connect the transmitter 50 to additional OCI antennas 42 and 44. The exciter 64 and the amplifier 60 are operated by the station control 58, at block 8, to produce the required pulses of RF carrier to be radiated by antennas 42 and 44. Also, at block 88, the beam steering unit 54 is preset to initiate the to-and-fro scan of the guidance beam 34 from the array antenna 26.

Upon the conclusion of transmission of the remaining OCI pulses, the switch 52 is operated, at block 90, to connect transmitter 50 back to the array antenna 26. The swept guidance beam 34 is then transmitted, at block 92, by activating the exciter 64 and the amplifier 60 to produce a pulse of RF carrier and, concurrently with the generation of this RF pulse, to apply phase shift commands from the beam steering unit 54 to the phasors 46. The phase shift commands are updated continusouly to provide for the sweeping of the guidance beam 34. Thereafter, at block 94, the operational sequence returns to block 78.

Figure 4:
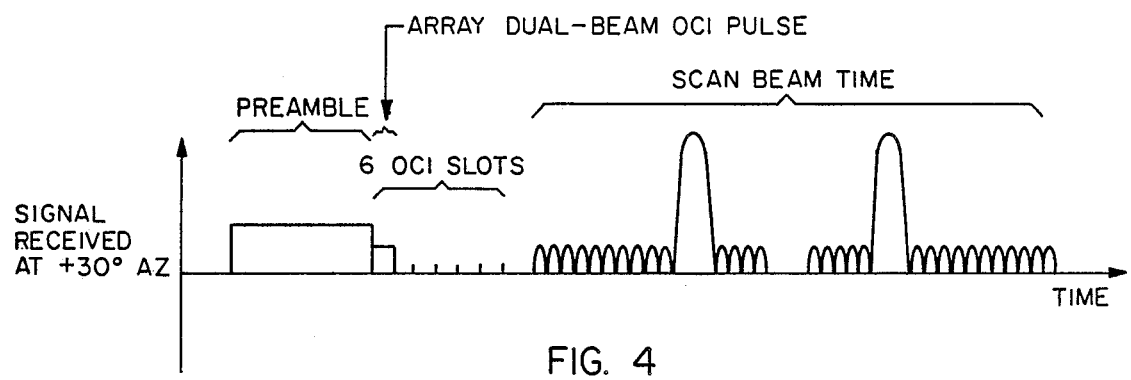

In FIGS. 4–7, the signals received at the airborne MLS receiver 40 are depicted. The signals are transmitted in a sequence wherein the OCI signal provided by the array antenna 26 is transmitted during the first available OCI time slot. In the situation presented by FIG. 4, the aircraft 24 (FIG. 1) is located at an azimuth of +30°, and receives the signals sequentially as a function of time as shown in the graph of FIG. 4. First the preamble is received from the data antenna 36. This is followed by the OCI signal which is depicted at reduced amplitude because the aircraft is out of the strong signal region of the beams 32. Next, the aircraft receives the signal of the guidance beam 34 during a "TO" sweep followed by a reception of the guidance beam signal during a "FRO" sweep. Also depicted in each of the graphs of FIGS. 4–7, is low amplitude side-lobe clutter surrounding the beam 34 in the radiation pattern of the beam 34.

Figure 5:
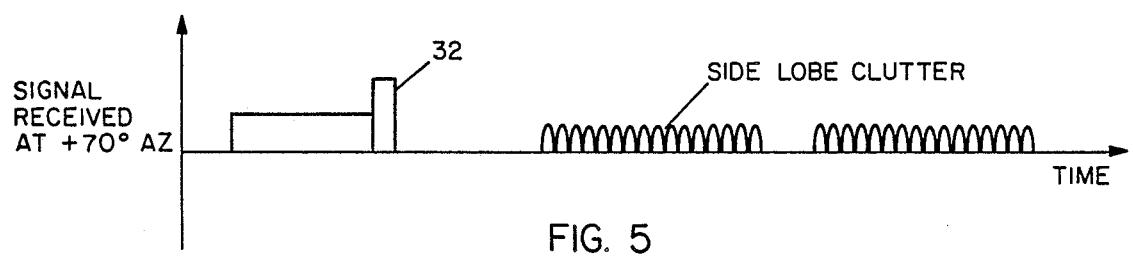

FIG. 5 presents basically the same situation a FIG. 4, except that in the situation of FIG. 5, the aircraft is located at an azimuth of +70°, this being outside the sweeping range of the guidance beam 34 and close to the strong signal region of the OCI beams 32. Therefore, the signal of the OCI beams 32 is depicted with relatively large amplitude, while the main beam signal of the guidance beam 34 is omitted.

Figure 6:
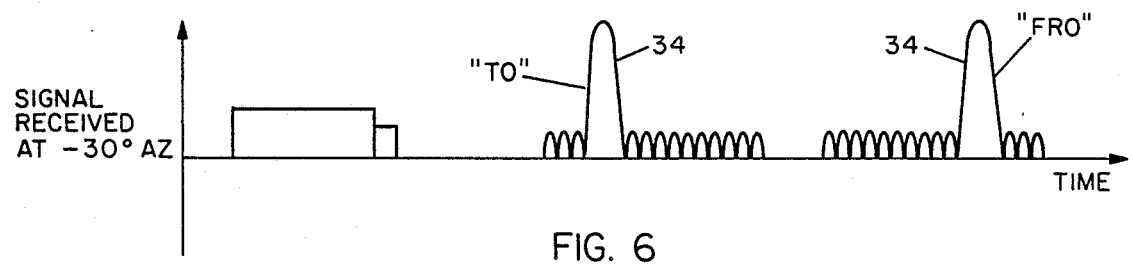

FIG. 6 presents basically the same as FIG. 4, except that in the situation of FIG. 6, the aircraft is located at an azimuth of −30°, and receives the signals sequentially as a function of time as shown in the graph of FIG. 6. First the preamble is received from the data antenna 36. This is followed by the OCI signal which is depicted at reduced amplitude because the aircraft is out of the strong signal region of the beams 32. Next, the aircraft is out of the strong signal of the guidance beam 34 during a "TO" sweep followed by a reception of the guidance beam signal during a "FRO" sweep. In FIG. 6, the "TO" signal is received earlier than in FIG. 4, and the "FRO" signal is received later than in FIG. 4 because of the differences in locations of the aircraft relative to the runway 22.

Figure 7:
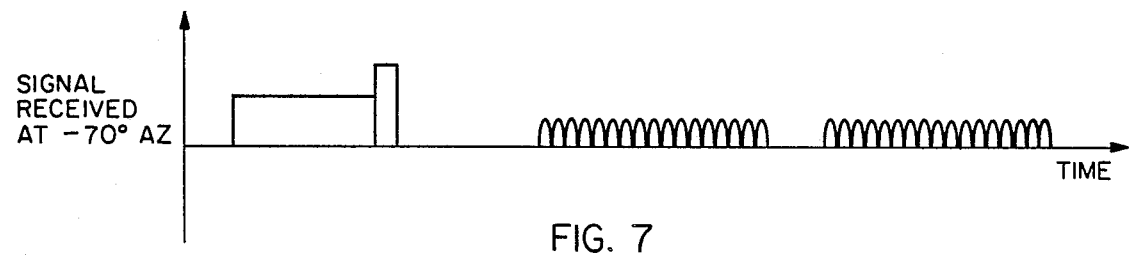

FIG. 7 presents basically the same situation as FIG. 4, except that in the situation of FIG. 7, the aircraft is located at an azimuth of −70°, this being outside the sweeping range of the guidance beam 34 and close to the strong signal region of the OCI beams 32. Therefore, the signal of the OCI beams 32 is depicted with relatively large amplitude, while the main beam signal of the guidance beam 34 is omitted.

Figure 8:
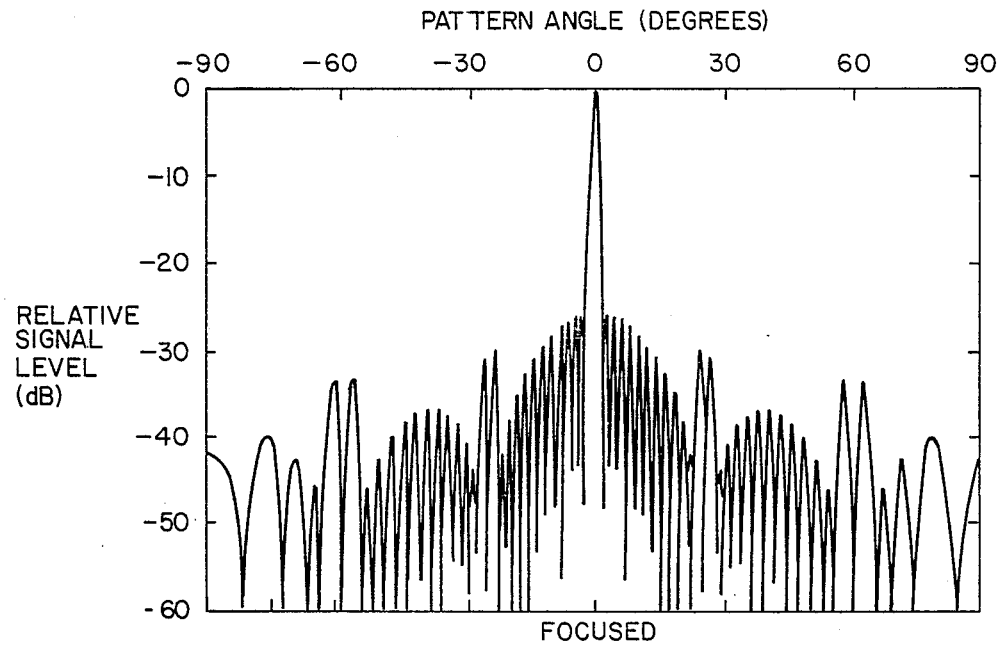
FIG. 8 shows a radiation pattern from an array antenna of FIG. 1 for the case of a focused on-axis beam.
Figure 9:
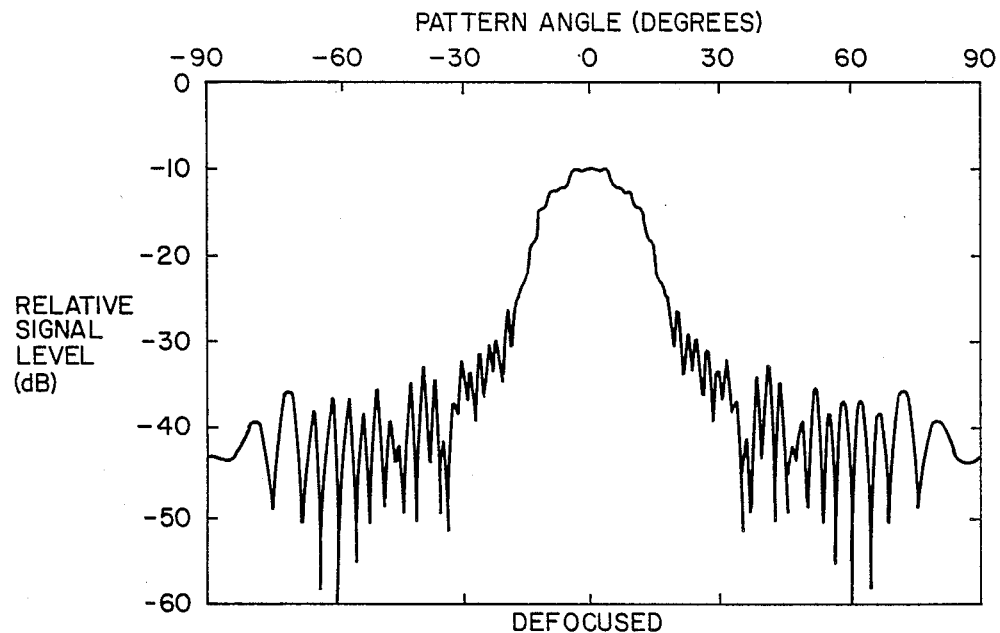
FIG. 9 is a radiation pattern for the beam of FIG. 8 upon a defocusing of the beam.
Figure 10:
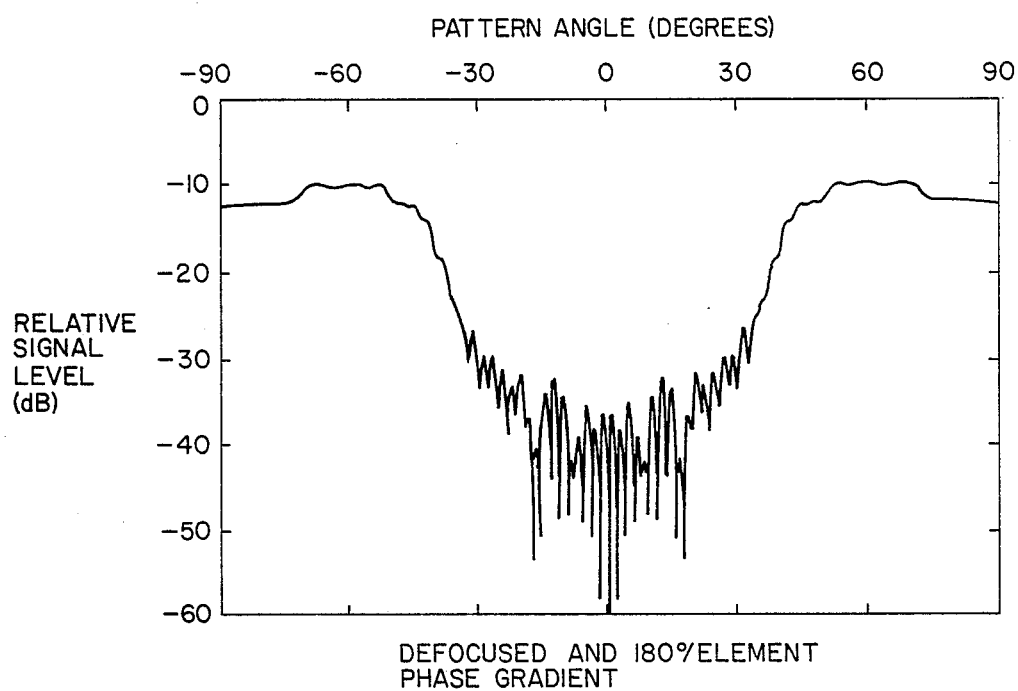
FIG. 10 shows the radiation pattern of a main lobe and a grating lobe produced by the array antenna of FIG. 1 wherein both of the lobes have been defocused to provide a pair of OCI beams in accordance with the invention.

FIGS. 8 and 9 show, respectively, a focused and a defocused form of a beam produced by the antenna 26 and directed along the antenna axis 30. The focused beam of FIG. 8, which is much narrower than the defocused beam of FIG. 9, is employed as the guidance beam to be swept about the runway 30, as has been described above. Only the central position of the swept guidance beam is presented in FIG. 8. The radiation pattern of FIG. 9 demonstrates that the beam can become sufficiently broad by defocusing to be suitable as an OCI beam. Two such defocused beams, as will be described with reference to FIG. 10, are provided by the antenna 26 in accordance with the invention, as will now be described.

Figure 11:
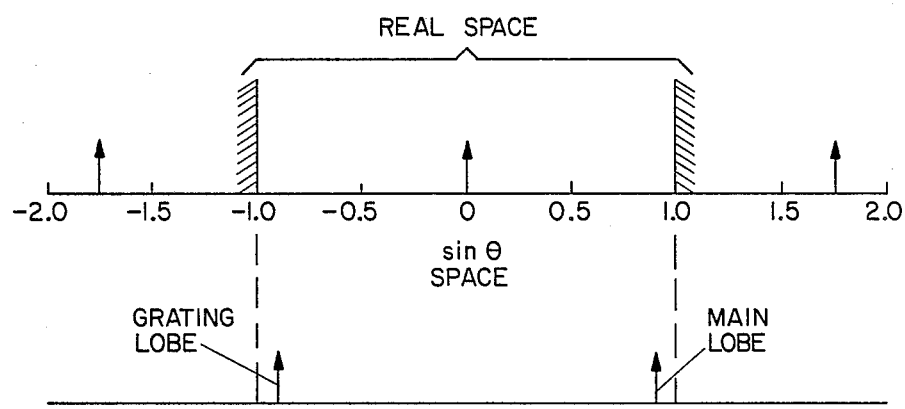
FIG. 11 is a diagram, useful in explaining the generation of the main lobe and the grating lobe by presenting the antenna characteristic in sine $\emptyset$ space.

By deflecting the beam of FIG. 8 beyond the normal scan range, a grating lobe appears. Upon defocusing both the main lobe and the grating lobe, as is depicted in FIG. 10, the antenna 26 provides two OCI beams disposed on opposite sides of the regions of the swept main guidance beam. In this way, the invention provided for the generation of both the scanning beam and the OCI beams by use of a single phased array antenna, namely antenna 26.

the invention feature of employing the single phased array antenna 26 for the generation of both the scanning beam and the two fixed OCI beams may be explained as follows. As is well known in antenna theory, and incoming electromagnetic wave, incident upon the array of antenna elements 28 induces electric signals in the elements 28 which differ in phase by an amount proportional to the sine of an angle of inclination of the direction of propagation of the wave relative to a normal to the linear array of the elements 28. For purposes of analysis of the operation of an antenna, it is sometimes convenient to describe the antenna operation mathematically in terms of sine ∅ space, as shown in FIG. 11, wherein ∅ is the foregoing angle of inclination. For relatively small angles of inclination, only the main lobe of the radiation pattern is present, along with side lobes of much smaller amplitude as is disclosed in the focused beam of FIG. 8 and the defocused beam of FIG. 9. The center of the lobe, or beam, of FIGS. 8 and 9 is moved to the right or to the left according to the angle of incidence of the beam direction relative to a central axis (the antenna axis) of the array. However, as shown in the sine ∅ space of FIG. 11, for large values of incidence, a grating lobe appears in addition to the main lobe.

The spacing between grating lobes, expressed in sine ∅ space, is equal to the ratio of wavelength divided by the interelement spacing between two successive antenna element 28. This is the reciprocal of the interelement spacing expressed in wavelengths. Two lobes, namely the main lobe and a grating lobe, each in a defocused condition, are shown in FIG. 10. The two lobes may be steered to the right or to the left by the introduction of additional phase shift at each of the phasors 46. The phase shift introduced by the phasors 46 is adjusted so that the grating lobe and the main lobe are symmetrically positioned about the array axis, as depicted in FIG. 10 for generation of the two OCI beams.

In the preferred embodiment of the invention, the line array elements 28 of the antenna 26 has fifty-two elements, there being twenty-six elements on one side of the antenna axis and twenty-six elements on the other side of the antenna axis. The electromagnetic wavelength is 2.333 inches, and the distance between the antenna elements is 1.362 inches measured on centers of the elements 28. Therefore, the spacing between the lobes in FIG. 11 is 1.7129. The offset between either of the main and the grating lobes and the array axis is one-half the spacing between lobes. The offset may be expressed in radians by taking the inverse sine of the offset in sine ∅ space. Expressed in degrees, the offset is 58.9°. Thus, the two beams portrayed in FIG. 10 are attained by scanning the main lobe off center to an angle of 58.92°, the defocusing broadens each beam to fill a sector ranging from 42° to 90° as measured from the antenna axis. The phasing of the array elements 28 is computed by assuming that a point source of radiation is located directly behind the center of the array aperture at a distance of 51.58 wavelengths. In the generation of the dual beam pattern of FIG. 10, the phase gradiant provided by the phasors 46 is 180° per antenna element, this phase gradiant being added to a defocusing phase pattern to produce the individual amounts of phase shift between successive ones of the antenna elements 28. Defocusing of an antenna beam is well known, and is readily accomplished by introduction of a quadratic phase shift pattern among the antenna element 28, this being in addition to the linear phase gradient employed in the scanning of the beam to a desired angle off of the antenna axis.

The defocusing phase component superimposed upon the linear phase gradient provides a beamwidth of 16.5° for the main beam, measured with the main beam directed at broadside. Upon scanning the main beam off to the side so that both of the OCI beams appear, the resulting OCI dual-sector pattern has a gain relative to the peak scanning beam gain as follows. For an array antenna with a beamwidth of one degree, the OCI gain is −15 dB with respect to the peak array gain. For an antenna array with a beamwidth of two degrees, the OCI gain is −12 dB.

Tables 1 and 2 provide information concerning construction of the invention, Table 1 and Table 2 providing the same information concerning respective ones of the antenna elements 28. The information provided for each element 28 includes its position in the radiating aperture of the antenna 26 as measured in wavelengths from one end element of the antenna 26, the relative amplitude of a signal radiated from the element 28 in decibels compared to a maximum radiated intensity of the center elements 28, and the phase angle in degrees applied by a phasor 46 to the element 28. Table 1 discloses this information for the first twenty-six phasors, and Table 2 discloses this information for the twenty-seventh through the fifty-second phasor.

TABLE 1

ARRAY EXCITATION, OCI PULSE

| PHASOR NO. | APERTURE POSITION (λ) | AMP (−dB) | PHASE (DEG) |
|---|---|---|---|
| 1 | 0 | 7.229 | 28.3 |
| 2 | .58 | 7.229 | 151.8 |
| 3 | 1.16 | 7.229 | 277.4 |
| 4 | 1.74 | 7.229 | 45.1 |
| 5 | 2.32 | 7.203 | 175 |
| 6 | 2.9 | 7.203 | 307 |
| 7 | 3.48 | 7.203 | 81.2 |
| 8 | 4.06 | 7.203 | 217.5 |
| 9 | 4.64 | 4.433 | 356.1 |
| 10 | 5.22 | 4.333 | 136.9 |
| 11 | 5.8 | 4.33 | 279.9 |
| 12 | 6.38 | 4.333 | 65.2 |
| 13 | 6.96 | 2.427 | 212.7 |
| 14 | 7.54 | 2.427 | 2.5 |
| 15 | 8.12 | 2.427 | 154.6 |
| 16 | 8.7 | 2.427 | 309 |
| 17 | 9.28 | 1.058 | 105.7 |
| 18 | 9.86 | 1.058 | 26.46 |
| 19 | 10.44 | 1.058 | 65.9 |
| 20 | 11.02 | 1.058 | 229.5 |
| 21 | 11.6 | .261 | 35.5 |
| 22 | 12.18 | .261 | 203.8 |
| 23 | 12.76 | .261 | 14.4 |
| 24 | 13.34 | .261 | 187.3 |
| 25 | 13.92 | 0 | 2.6 |
| 26 | 14.5 | 0 | 180.3 |

TABLE 2

ARRAY EXCITATION, OCI PULSE

| PHASOR NO. | APERTURE POSITION (λ) | AMP (−dB) | PHASE (DEG) |
|---|---|---|---|
| 27 | 15.08 | 0 | .3 |
| 28 | 15.66 | 0 | 182.6 |
| 29 | 16.24 | .261 | 7.3 |
| 30 | 16.82 | .261 | 194.4 |
| 31 | 17.4 | .261 | 23.8 |
| 32 | 17.98 | .261 | 215.5 |
| 33 | 18.56 | 1.058 | 49.5 |
| 34 | 19.14 | 1.058 | 245.9 |
| 35 | 19.72 | 1.058 | 84.6 |
| 36 | 20.3 | 1.058 | 285.7 |
| 37 | 20.88 | 2.427 | 129 |
| 38 | 21.46 | 2.427 | 334.6 |
| 39 | 22.04 | 2.427 | 182.5 |
| 40 | 22.62 | 2.427 | 32.7 |
| 41 | 23.2 | 4.433 | 245.2 |
| 42 | 23.78 | 4.433 | 99.9 |
| 43 | 24.36 | 4.433 | 316.9 |
| 44 | 24.94 | 4.433 | 176.1 |
| 45 | 25.52 | 7.203 | 37.5 |
| 46 | 26.1 | 7.203 | 261.2 |
| 47 | 26.68 | 7.203 | 127 |
| 48 | 27.26 | 7.203 | 355 |
| 49 | 27.84 | 7.229 | 225.1 |
| 50 | 28.42 | 7.229 | 97.4 |
| 29 | | 7.229 | 331.8 |
| 52 | 29.58 | 7.229 | 208.3 |

While there has been described what is at present considered to be the preferred embodiment of the invention, it will be obvious to those skilled in the art that various changes and inprovements may be made therein without departing from the invention and it is, therefore, intended to cover all such changes and improvements as fall within the true spirit and scope of the invention.

What is claimed is:

1. In an aircraft landing system having ground-based equipment and airborne equipment, ground-based equipment comprising:

an array antenna and a sector antenna;

first signal generating means for supplying a data signal to said sector antenna, said data signal including information useful for synchronizing said airborne equipment with the operation of said ground-based equipment;

second signal generating means for supplying a set of signals to said array antenna for producing an out-of-coverage indication (OCI) radiation pattern, having a pair of lobes directed on the centerline of said array;

third signal generating means for supplying a set of signals to said array antenna for producing a beam which sweeps to and fro about the centerline of said array;

switching means for coupling said second or third signal generating means to said array antenna at selected times; and timing means coupled to said first second and third signal generating means for synchronizing their operation.

2. Equipment according to claim 1 wherein one of said OCI lobes is main lobe and the other of said OCI lobes is a grating lobe, the grating lobe being obtained by steering the main lobe to one side of the centerline of said array antenna.

3. Equipment according to claim 2 wherein said main lobe and said grating lobe are defocused.

4. Equipment according to claim 1 further comprising a set of phase shifters coupled between said second signal generating means and individual elements of said array antenna, said second signal generating means including a memory for storing values of phase shift associated with the OCI pattern, individual ones of said values of OCI pattern phase shift being communicated via said second signal generating means to each of said phase shifters for imparting the phase shifts for generating the OCI radiation pattern; and wherein one of said OCI lobes is the main lobe of said array antenna and the other of said OCI lobes is a grating lobe, the grating lobe being obtained by steering said main lobe to one side of the centerline of said array antenna; and wherein said main lobe and said grating lobe are defocused to cover an OCI region on each side of the centerline of said array antenna.

5. Equipment according to claim 4 wherein the values of OCI pattern phase shift are applied to radio frequency signals at each of the antenna elements at a phase gradient of 180° per antenna element plus a defocusing phase increment.

* * * * *